United States Patent
Speers et al.

(10) Patent No.: US 8,162,565 B2
(45) Date of Patent: Apr. 24, 2012

(54) BREAK-AWAY MATERIAL RETAINER FOR PAVING VEHICLES

(75) Inventors: Leonard E. Speers, Fayetteville, PA (US); Terrence M. Toohig, Chambersburg, PA (US)

(73) Assignee: Volvo Construction Equipment AB, Eskilstuna (CH)

( * ) Notice: Subject to any disclaimer, the term of this patent is extended or adjusted under 35 U.S.C. 154(b) by 449 days.

(21) Appl. No.: 12/080,144

(22) Filed: Apr. 1, 2008

(65) Prior Publication Data

US 2009/0245937 A1    Oct. 1, 2009

(51) Int. Cl.
*E01C 19/43* (2006.01)

(52) U.S. Cl. ............................................ 404/118; 403/2
(58) Field of Classification Search .................. 404/114, 404/118; 403/2
See application file for complete search history.

(56) References Cited

U.S. PATENT DOCUMENTS

| | | | |
|---|---|---|---|
| 3,961,493 A | 6/1976 | Nolan et al. | |
| 4,124,325 A | 11/1978 | Cutler | |
| 4,267,871 A * | 5/1981 | Weidler | 152/189 |
| 4,352,382 A * | 10/1982 | Weidler | 152/189 |
| 4,708,519 A | 11/1987 | Davin et al. | |
| 4,749,304 A | 6/1988 | Craig | |
| 4,823,366 A | 4/1989 | Williams | |
| 5,232,305 A | 8/1993 | Bassett et al. | |
| 5,401,115 A | 3/1995 | Musil et al. | |
| 5,851,085 A | 12/1998 | Campbell | |
| 6,802,667 B2 | 10/2004 | Baker | |

FOREIGN PATENT DOCUMENTS

JP      2005-377729      *  6/2005

* cited by examiner

*Primary Examiner* — Gary S Hartmann
(74) *Attorney, Agent, or Firm* — Michael Best & Friedrich LLP (57) ABSTRACT

A material anti-segregation device is for a paving vehicle including a tractor, a screed for forming a mat of paving material on a base surface, and an auger. The anti-segregation device includes a plurality of flexible, elongated barrier members each coupled with the tractor and collectively defining a curtain. The curtain is configured to generally retain paving material between the curtain and the screed. A plurality of couplers are each configured to connect at least a portion of a separate one of the barrier members with the tractor. Each coupler alternatively disconnects the barrier member or portion from the tractor when tension in the connected member exceeds a predetermined value so as to prevent damage to the tractor. As each barrier member is connected with either a portion or component of the tractor, the predetermined tension value is less than a failure limit of the tractor portion or component.

22 Claims, 11 Drawing Sheets

FIG. 16

BREAK-AWAY MATERIAL RETAINER FOR PAVING VEHICLES

The present invention relates to paving vehicles, and more particularly to devices for containing a paving material head for use with paving vehicles.

Paving vehicles or "pavers" are generally known and include a chassis or tractor, a bin or hopper for containing a quantity of paving material (e.g., asphalt), an auger connected with the tractor for spreading material laterally rearwardly thereof, and a screed for leveling paving material connected with the tractor so as to be pulled from the rear end thereof. Paving material is typically transferred by means of a conveyor from the bin/hopper mounted on the front of the tractor toward the rear of the tractor, where the material falls from the tractor and deposits onto a base surface (e.g., a roadbed).

The auger is positioned between the rear end of the tractor and the screed and spreads the paving material falling off of the tractor laterally across front of the screed so as to form a head of material. As the paver travels on the base surface, the screed is pulled into the head of material such that a portion of the material head flows under the screed and is leveled, and preferably also compressed, into a mat of material.

Typically, the paving material is formed of an aggregate of material particles of various sizes and there are generally substantial size differences between the larger and smaller particles. Due to these size differences, larger particles, particularly those particles at the top of the material head, tend to fall from the head of material as the paving material is first deposited and then spread by the auger. As such, the head "segregates" or separates into regions of larger particles and smaller particles, with the larger particles tending to accumulate forwardly of the remainder of the head. With such material segregation, the portions of the material head that are leveled tend to have a greater than intended portion of smaller or finer particles, thereby reducing the "strength" of the formed mat.

One device for preventing material segregation is described in U.S. Pat. No. 6,802,667 of Adrian Baker, which is owned by the assignee of the present application. This anti-segregation device includes a plurality of chains connected with the rear of a tractor so as to form a flexible curtain. The present application involves improvements to the device disclosed in U.S. Pat. No. 6,802,667.

SUMMARY OF THE INVENTION

In one aspect, the present invention is a material anti-segregation device for a paving vehicle, the vehicle including a tractor, a screed towed from the tractor for forming a mat of paving material on a base surface, and an auger disposed between the tractor and the screed. The anti-segregation device comprises a plurality of flexible, elongated barrier members each coupled with the tractor and collectively defining a curtain. The curtain is configured to generally retain paving material between the curtain and the screed. Further, a plurality of couplers are each configured to connect at least a portion of a separate one of the barrier members with the tractor. Each coupler is also configured to disconnect the at least a portion of the one barrier member from the tractor when tension in the connected member exceeds a predetermined value.

In another aspect, the present invention is again a material anti-segregation device for a paving vehicle, the paving vehicle being as described above. The anti-segregation device comprises a plurality of flexible, elongated barrier members each coupled with the tractor and collectively defining a curtain. The curtain is configured to generally retain paving material between the curtain and the screed. Further, a plurality of couplers each include a bendable tab configured to engage with a separate one of the barrier members. Each tab is configured to deflect between a first configuration, in which the coupler retains the barrier member connected with the tractor, and a second configuration in which the barrier member is removable from the tab so as to disconnect from the tractor. The tabs are each further configured to deflect from the first configuration toward the second configuration when tension in the barrier member exceeds a predetermined value.

In yet another aspect, the present invention is once again a material anti-segregation device for a paving vehicle, the vehicle being as described above. The anti-segregation device comprises a plurality of flexible, elongated barrier members each coupled with the tractor and collectively defining a curtain. The curtain is configured to generally retain paving material between the curtain and the screed. Each barrier member has a first end connected with the tractor and as second, free end disposeable generally upon the base surface. Further, a plurality of couplers are each configured to connect at least a portion of a separate one of the barrier members with the tractor. Each coupler is further configured to disconnect the at least a portion of the one barrier member from the tractor when the barrier member second end is held generally stationary with respect to the base surface during movement of the tractor.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 8A and 8B, collectively FIG. 8, are each a broken-away, side view of the upper portion of the anti-segregation device, showing a coupler in two different configurations during a process of connecting a barrier member to a tractor;

DETAILED DESCRIPTION OF THE INVENTION

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-16 a material anti-segregation device 10 for a paving vehicle 1. Such a paving vehicle 1 includes a tractor 2, a screed 3 towed from the tractor 2 for forming a mat of paving material M on a base surface S, and an auger 4 disposed between the tractor 2 and the screed 4. The anti-segregation device 10 basically comprises a plurality of flexible, elongated barrier members 12 and a plurality of couplers 14, preferably one coupler 14 for each barrier member 12. Each barrier member 12 is coupled with the tractor 2 and has a first, upper end 12a connected with the tractor 2 and a second, lower "free" end 12b generally disposeable or disposed upon the base surface S. As such, the plurality of barrier members 14 collectively define a curtain 11, the curtain 11 being configured to generally retain paving material M between the curtain 11 and the screed 3. Further, each coupler 14 is configured to releasably connect at least a portion of a separate one of the barrier members 12 with the tractor 2 and to disconnect the at least a portion of the one barrier member 12 from the tractor 2 when tension T in the connected member 12 exceeds a predetermined value, i.e. $T > T_P$, so as to prevent damage to the tractor 2. In other words, each barrier member 12 is connected with a portion or component of the tractor 2 (e.g., a frame panel or plate, a flow gate, etc.) and the predetermined tension value $T_P$ is less than a failure limit of the connected tractor portion or component. Thus, the associated coupler 14 is configured to release the barrier member 12 before tensile force T in the member 12 reaches a magnitude at which the connected tractor portion/component would become damaged or fail (i.e., bended, fractured, sheared, etc.).

More specifically, each coupler 14 is configured to disconnect from the at least a portion of the one barrier member 12 when the barrier member second end 12b is held generally stationary with respect to the base surface S during movement of the tractor 2. That is, when the second end 12b of one or more barrier members 12 is restrained or "caught" during tractor movement, such as by being "snagged" on a stationary object O as discussed below and depicted in FIGS. 9 and 10, the barrier member second end 12b is held stationary as the barrier first member end 12a continues moving with the tractor 2. This generates a tensile force T within the barrier member 12, which increases until exceeding a predetermined maximum value $T_P$, at which point the associated coupler 14 releases at least a portion of the barrier member 12 that includes the second end 12b, as depicted in FIG. 10. Otherwise, without the coupler 14 disconnecting at least the lower portion 13B of the barrier member 12 from connection with the tractor 2 (preferably both upper and lower portions 13A, 13B), the tensile force T would increase to the point that a reaction force $F_R$ exerted on the tractor 2 (i.e., in reaction to the tension) damages the tractor 2 at the point of attachment of the barrier member 12 to the tractor 2.

Figure 1:
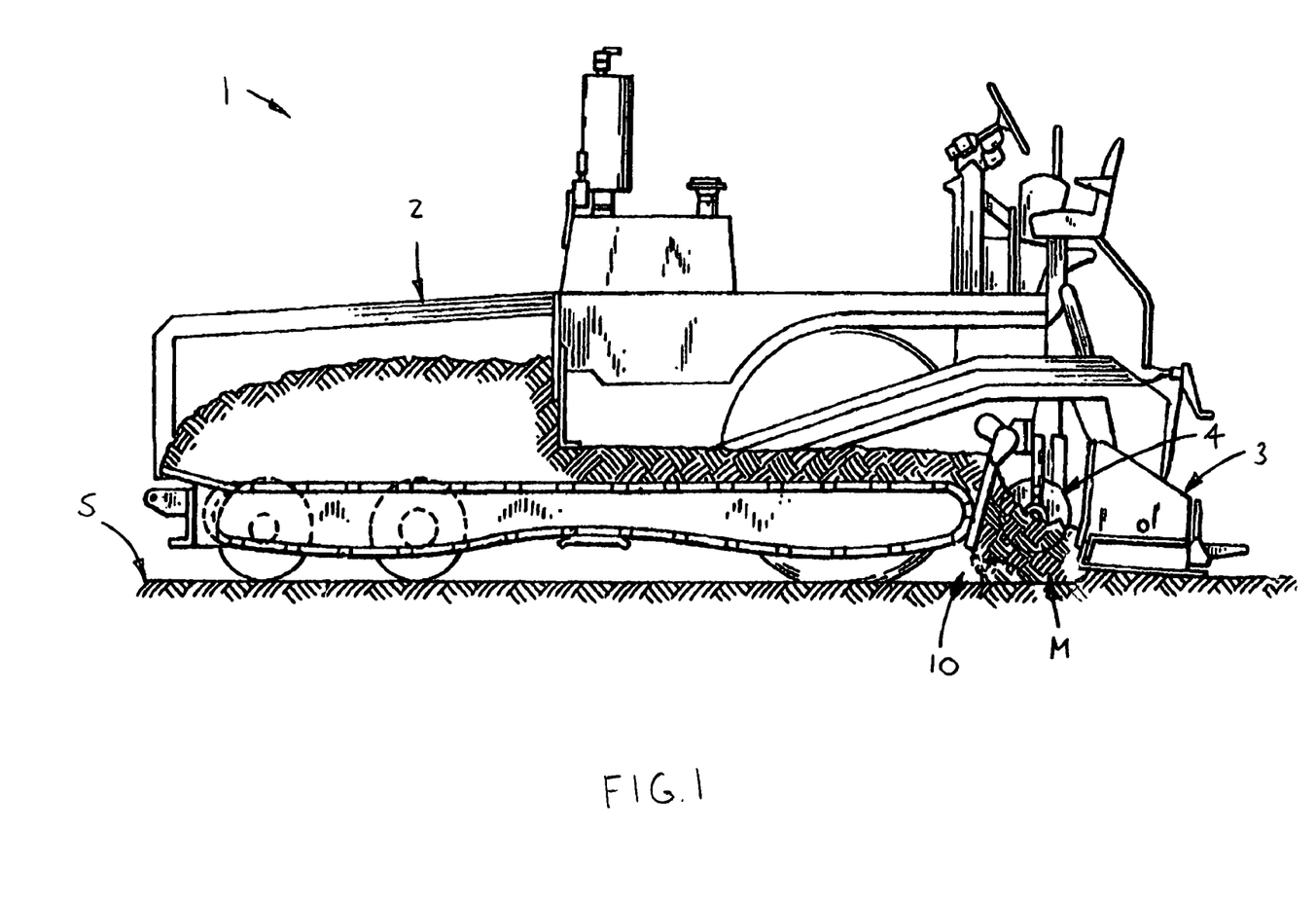
FIG. 1 is a side elevational view of a paving vehicle having a material anti-segregation device in accordance with the present invention.
Figure 2:
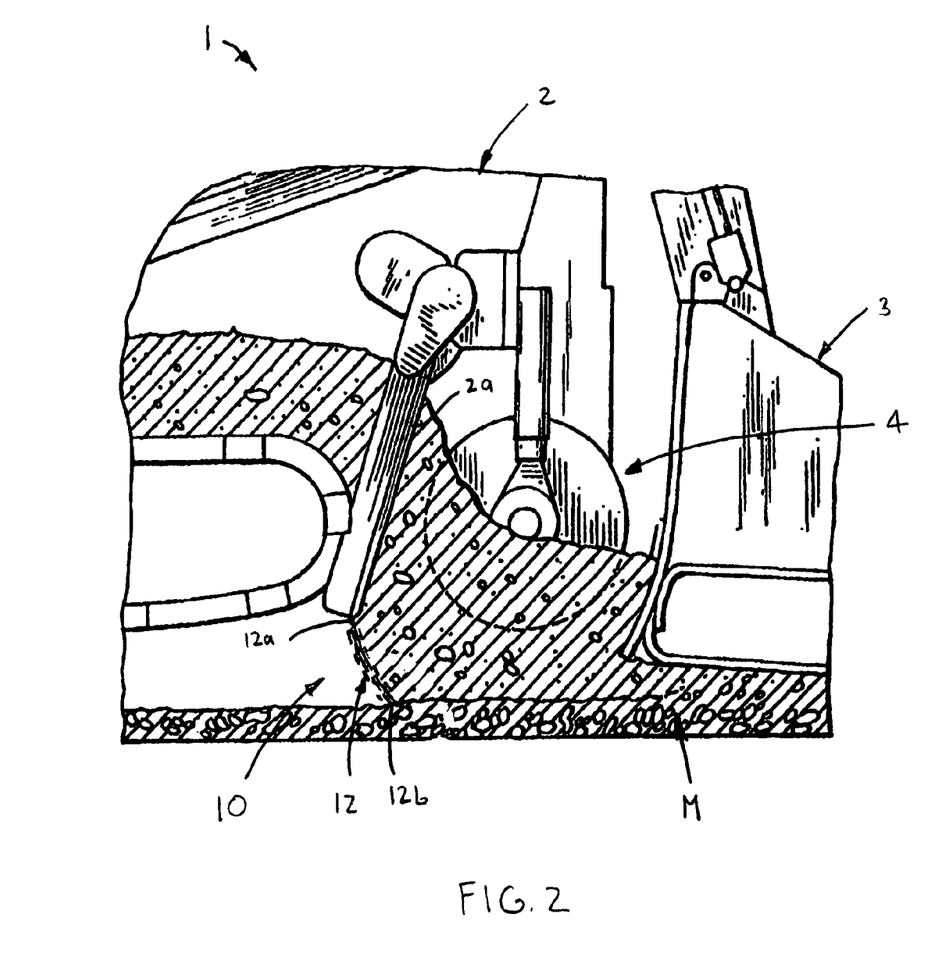
FIG. 2 is an enlarged, broken-away view of a portion of FIG. 1.
Figure 3:
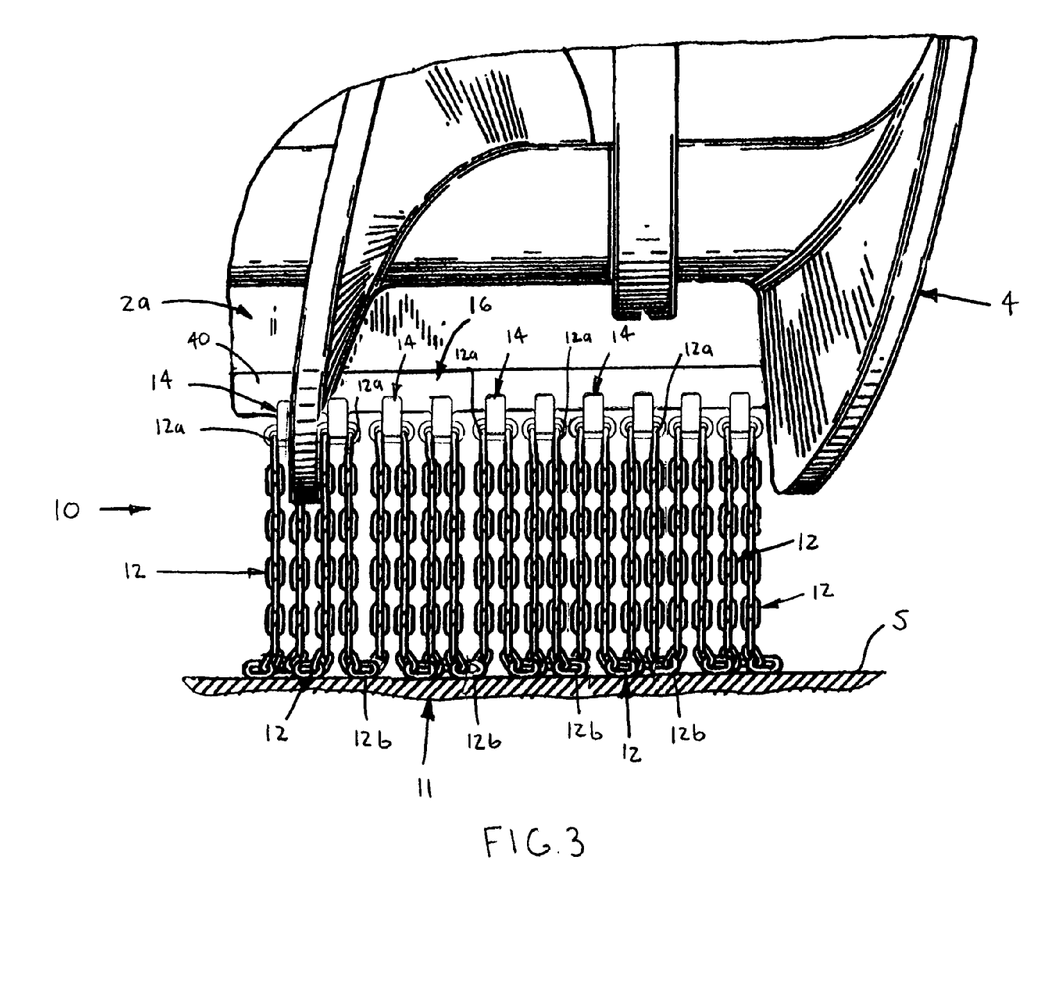
FIG. 3 is broken-away, rear elevational view of the paving vehicle, showing a section of an anti-segregation device connected with the rear end of the paving vehicle.
Figure 4:
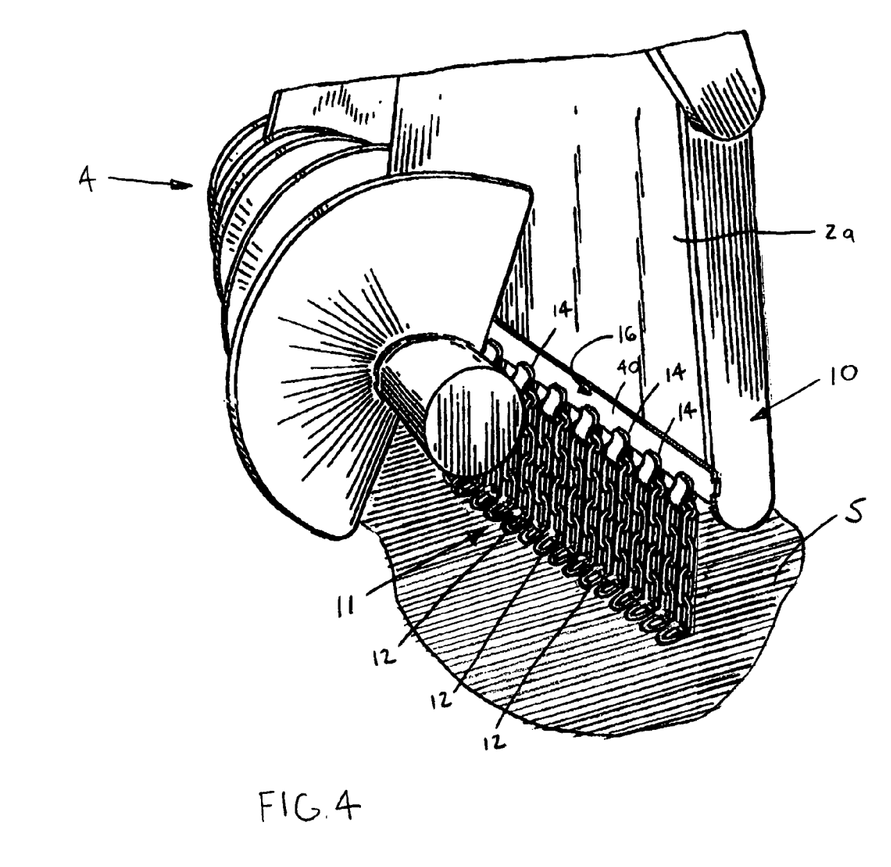
FIG. 4 is broken-away, rear perspective view of the paving vehicle, showing a section of the anti-segregation device.
Figure 5:
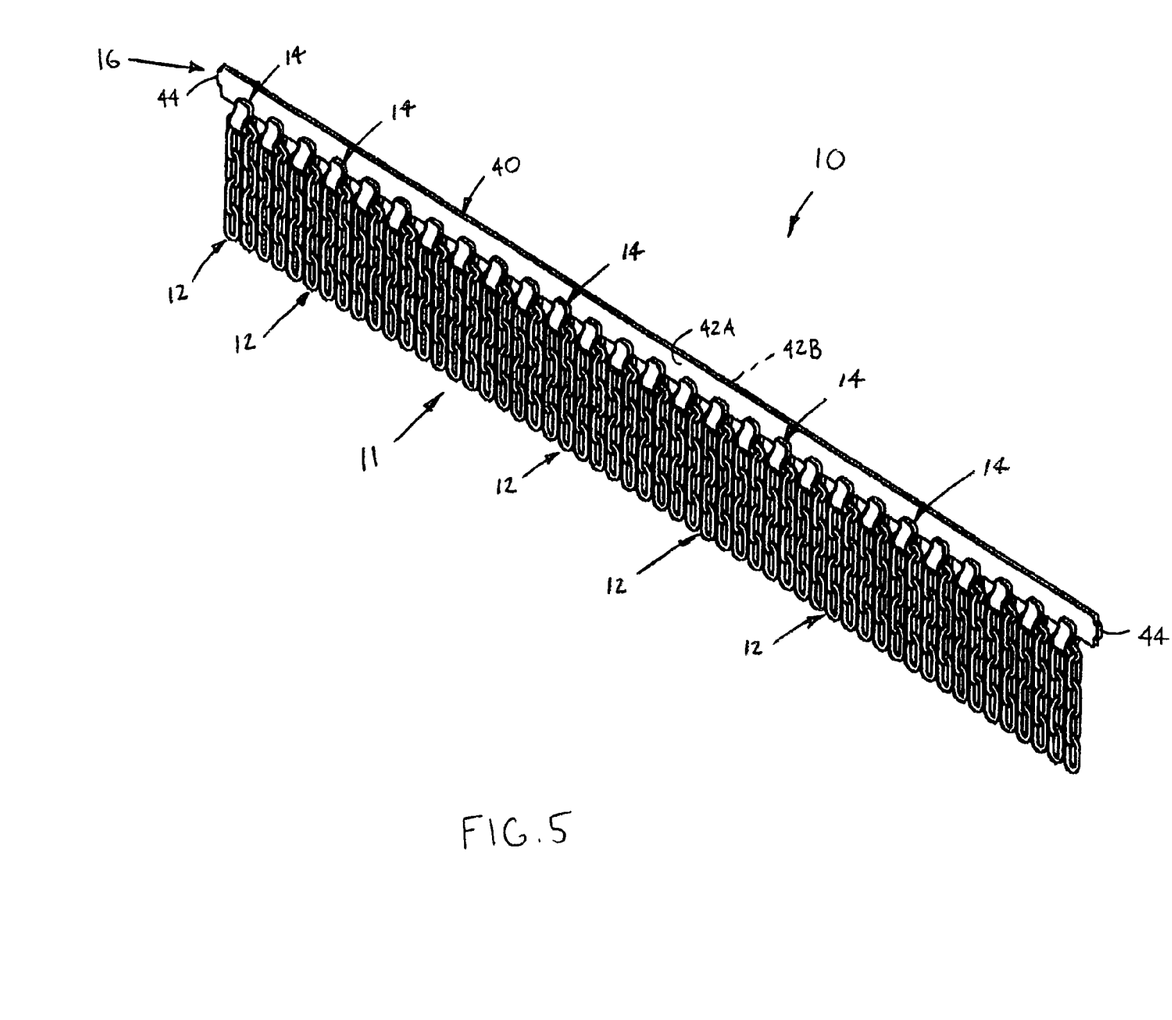
FIG. 5 is perspective view of the material segregation device, shown separate from a paving vehicle.

Preferably, each coupler 14 is mounted on the tractor 2 and is configured to releasably engage with the upper end 12a of the connected barrier member 12, each coupler 14 being configured to release the connected barrier member 12 separately from each other barrier member 12, as described below. More specifically, the plurality of couplers 14 are attached to and spaced apart laterally along the rear end 2b of the tractor 2, as best shown in FIGS. 3 and 4. Further, the anti-segregation device 10 preferably further comprises a base plate 16 connected with or mounted to the rear end 2a of the tractor 2, each coupler 14 being either mounted to the base plate 16 or preferably integrally formed with the base plate 16, as described in greater detail below. However, each barrier member 12 may alternatively include separate upper and lower portions 13A, 13B, with each coupler 14 being configured to releasably connect the lower portion 13B of a separate one of the barrier members 12 with the barrier member upper portion 13B (not shown).

Figure 8A:
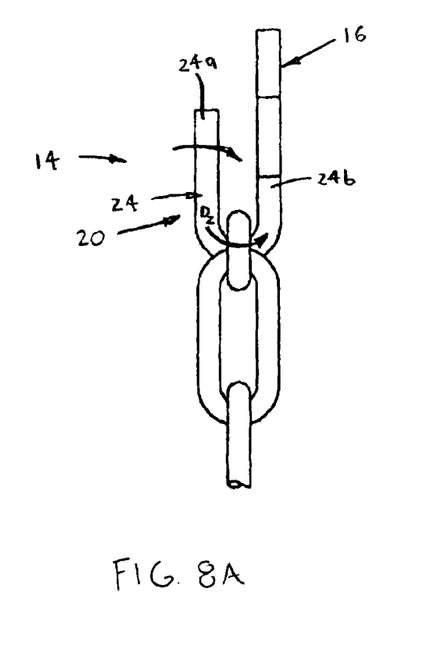
Figure 8B:
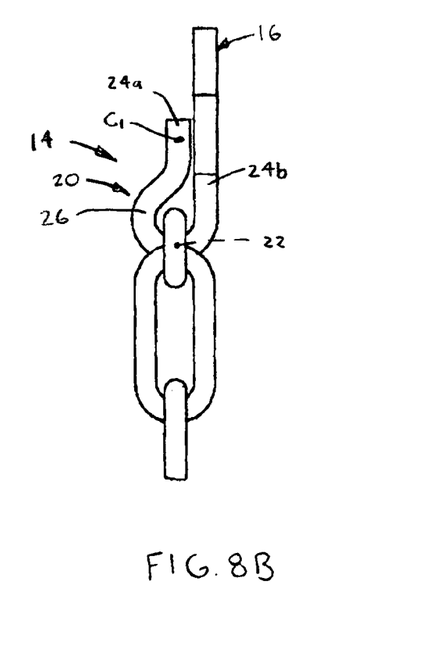
Figure 9:
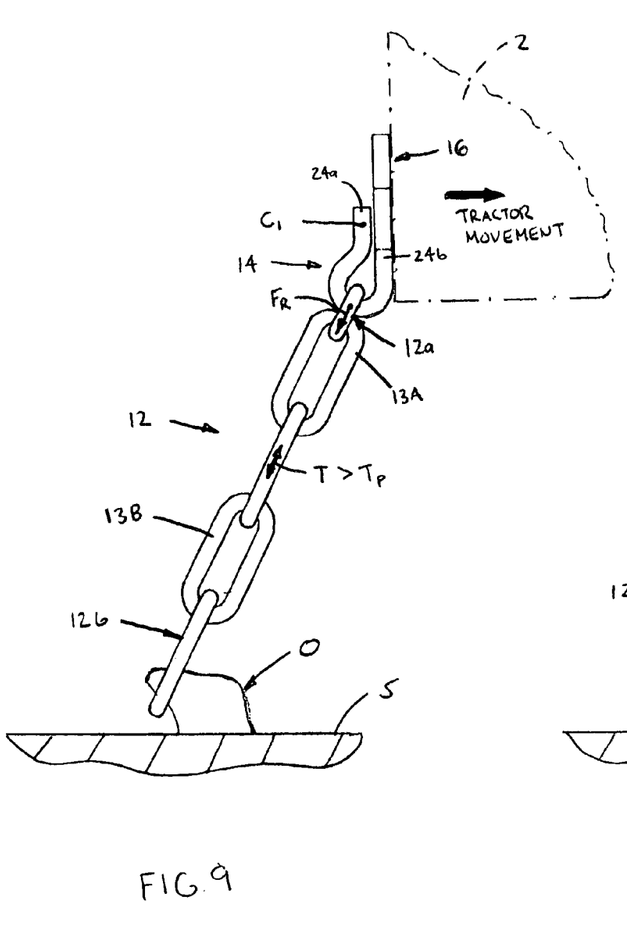
FIG. 9 is a side view of the anti-segregation device connected with the paving vehicle, showing a barrier member engaging with an object on a base surface.
Figure 10:
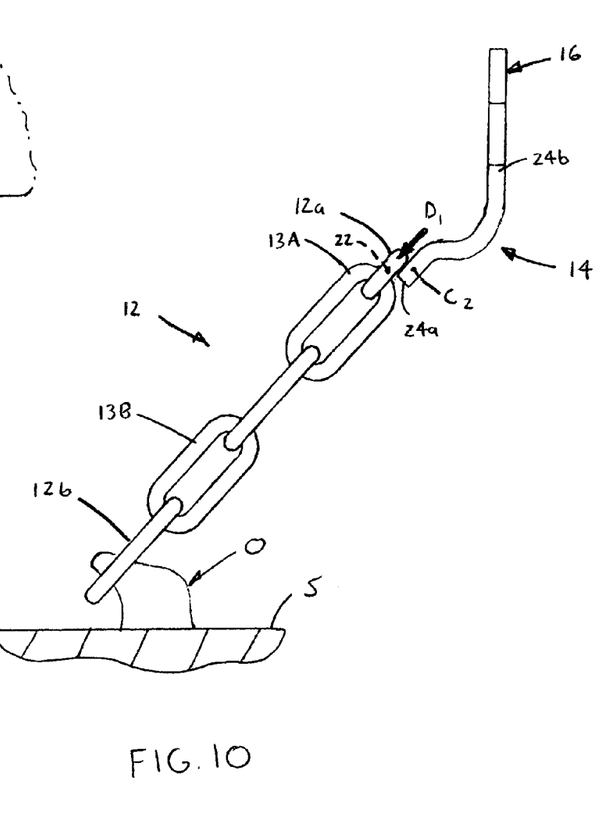
FIG. 10 is another view of the anti-segregation device of FIG. 9, showing a coupler disconnecting the barrier member from the paving vehicle.

Referring to FIGS. 6 and 9-12, each coupler 14 is configured to either bend or deflect between a first position or configuration $C_1$ (FIGS. 9 and 11) and a second position/configuration $C_2$ (FIGS. 10 and 11), or alternatively to fracture (FIG. 12), so as to thereby disconnect the connected barrier member 12 from the tractor 2. Preferably, each coupler 14 includes a bendable tab 20 configured to engage with a separate one of the barrier members 12 and to deflect between the first and second configurations $C_1$, $C_2$. In the first configuration $C_1$, the tab 20 retains the barrier member 12 connected with the tractor 2 (see, e.g., FIGS. 6 and 9) and in the second configuration $C_2$, the member 14 is removable from the tab 20 so as to disconnect from the tractor 2, as best shown in FIG. 10. Further, the tab 20 is configured to deflect or bend from the first configuration $C_1$ toward and/or to the second configuration $C_2$ when tension T in the barrier member 14 exceeds the predetermined value $T_P$, as indicated in FIG. 9. Furthermore, each coupler tab 20 is alternatively deflectable toward the first configuration $C_1$ to connect one of the barrier members 12 to the tractor 2, as shown in FIGS. 8A and 8B described in greater detail below.

Figure 15:
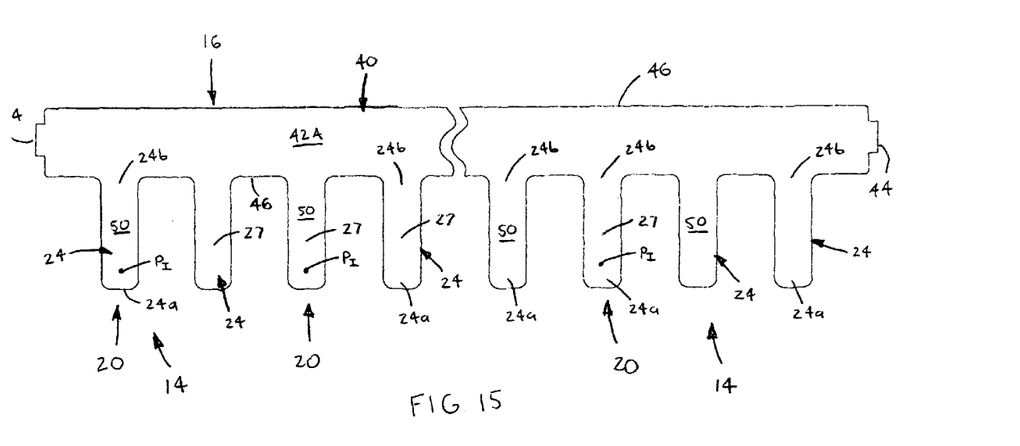
FIG. 15 is a plan view of base plate with a plurality of integral couplers.
Figure 16:
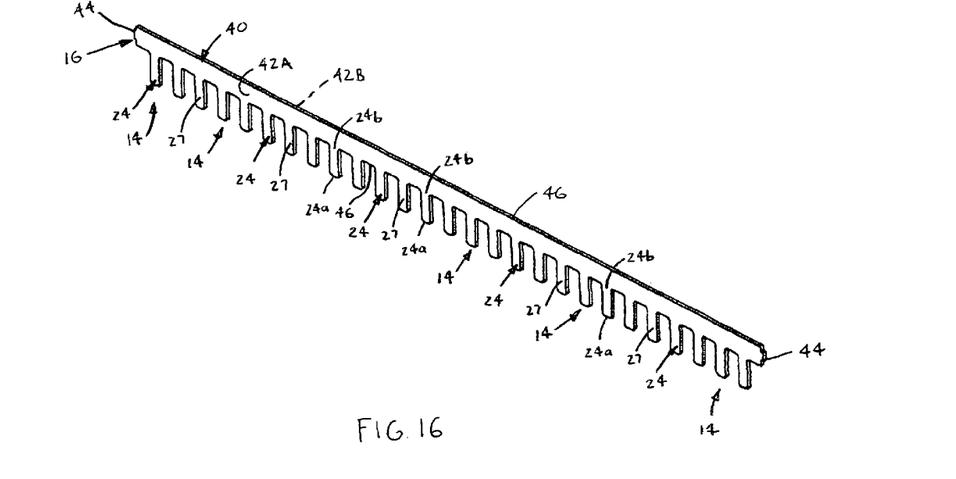
FIG. 16 is a perspective view of the base plate and integral couplers.

More specifically, each barrier member 12 preferably includes a mounting opening 22 and each tab 20 has an elongated, generally rectangular body 24 with first and second ends 24a, 24b, as shown in FIGS. 15 and 16. Each tab body 24 is configured or sized to extend through the opening 22 of the engaged barrier member 12 and to generally form a hook 26 (FIGS. 7 and 8B) in the tab first configuration $C_1$ such that the body first end 24a is located at least generally proximal to the body second end 24. Furthermore, each coupler tab 20 is configured to generally bend toward a flattened form 27 (FIGS. 15 and 16) as the body first end 24a displaces away from the second end 24b when deflecting from the first configuration $C_1$ to or toward the second configuration $C_2$, as best shown in FIG. 10 It must be noted that, although the tab body 24 deflects toward the flattened form in which the body 24 is generally "straight" or non-bended, the body 24 may in fact never reach a state of complete straightness or flatness. That is, the barrier member 14 will likely disengage from the tab 20 prior to the tab body 24 reaching the flattened form, and/or the tab 20 may form a permanent bend or kink (see FIG. 10) during the initial process of attaching the barrier member 12 to the tractor 2, as described below.

In any case, the barrier member 12 is displaceable over the tab first end 24a in a direction $D_1$ generally away from the tab second end 24a when the tab body 24 is disposed in the tab second configuration $C_2$, as best shown in FIG. 10. Such movement of the barrier member 12, which is preferably "relative movement" with the coupler 14 moving with the tractor 2 and the barrier member 12 remaining stationary, withdraws the tab body 24 from the barrier member opening 22 and thereby disconnects the barrier member 12 from the tractor 2. Alternatively, the barrier member 12 is displaceable over the tab first end 24a in a direction $D_2$ generally toward the tab second end 24a when the tab body 24 is disposed in the tab second configuration $C_2$ so as to insert the tab body 24 into the barrier member opening 22, as indicated in FIG. 8A. Thereafter, the tab body 24 is deflectable from the second configuration $C_2$ toward the first configuration $C_1$, preferably by means of a tool (not shown), when the tab body 24 is disposed or inserted within the barrier member opening 22 so as to connect the barrier member 12 with the tractor 2, as shown in FIGS. 8A and 8B and described in further detail below.

Figure 11:
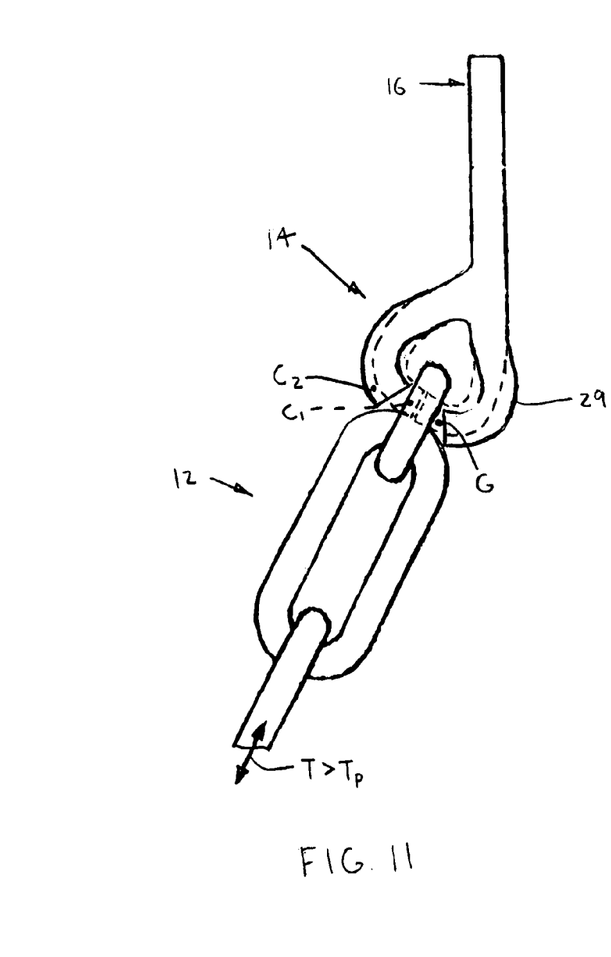
FIG. 11 is an enlarged view of an alternative construction of a coupler, showing the coupler disconnecting a barrier member from the paving vehicle.
Figure 12:
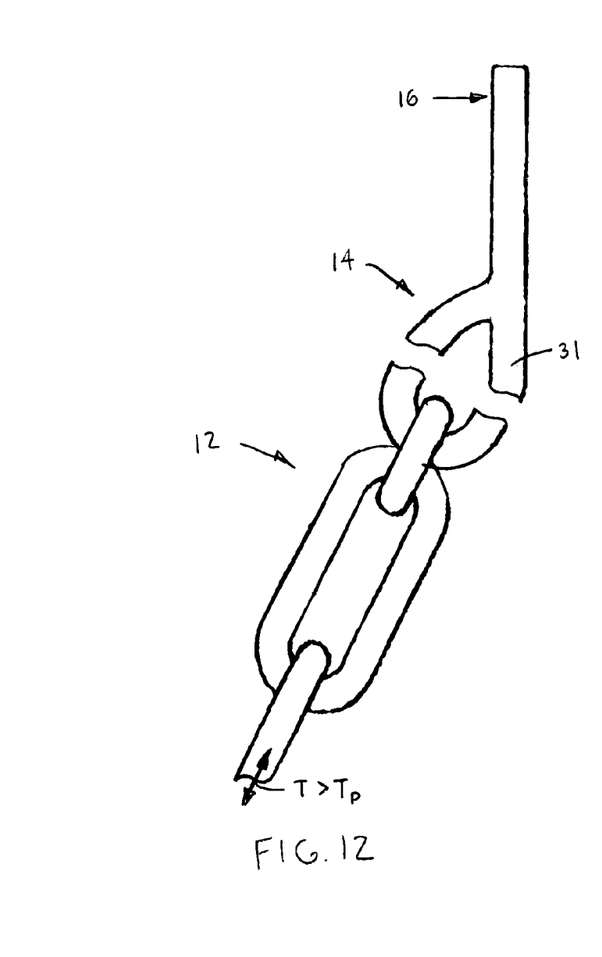
FIG. 12 is an enlarged view of another alternative construction of a coupler, showing the coupler disconnecting a barrier member from the paving vehicle

Although the tab body 24 is preferably formed and functions as described below, the coupler 14 may be formed in any other appropriate manner that enables the coupler to disconnect the barrier member 12 from the tractor 2 when tension T in the member 12 exceeds a predetermined value $T_P$. For example, the coupler 14 may be formed as "split" member 29 that deflects between first and second configurations $C_1, C_2$ so as to "open" a gap G in the member 29, to thereby permit the barrier member 12 to disconnect therefrom, when tension T in the barrier member 12 exceeds the predetermined value $T_P$, as shown in FIG. 11. Further, as mentioned above, the coupler 14 may be formed with a fractureable or frangible body 31, such as by appropriate material selection and/or sizing, so that the fractured coupler 14 releases the engaged barrier member 12 from connection with the tractor 2 when tension T exceeds the predetermined value $T_P$, as depicted in FIG. 12.

Figure 6:
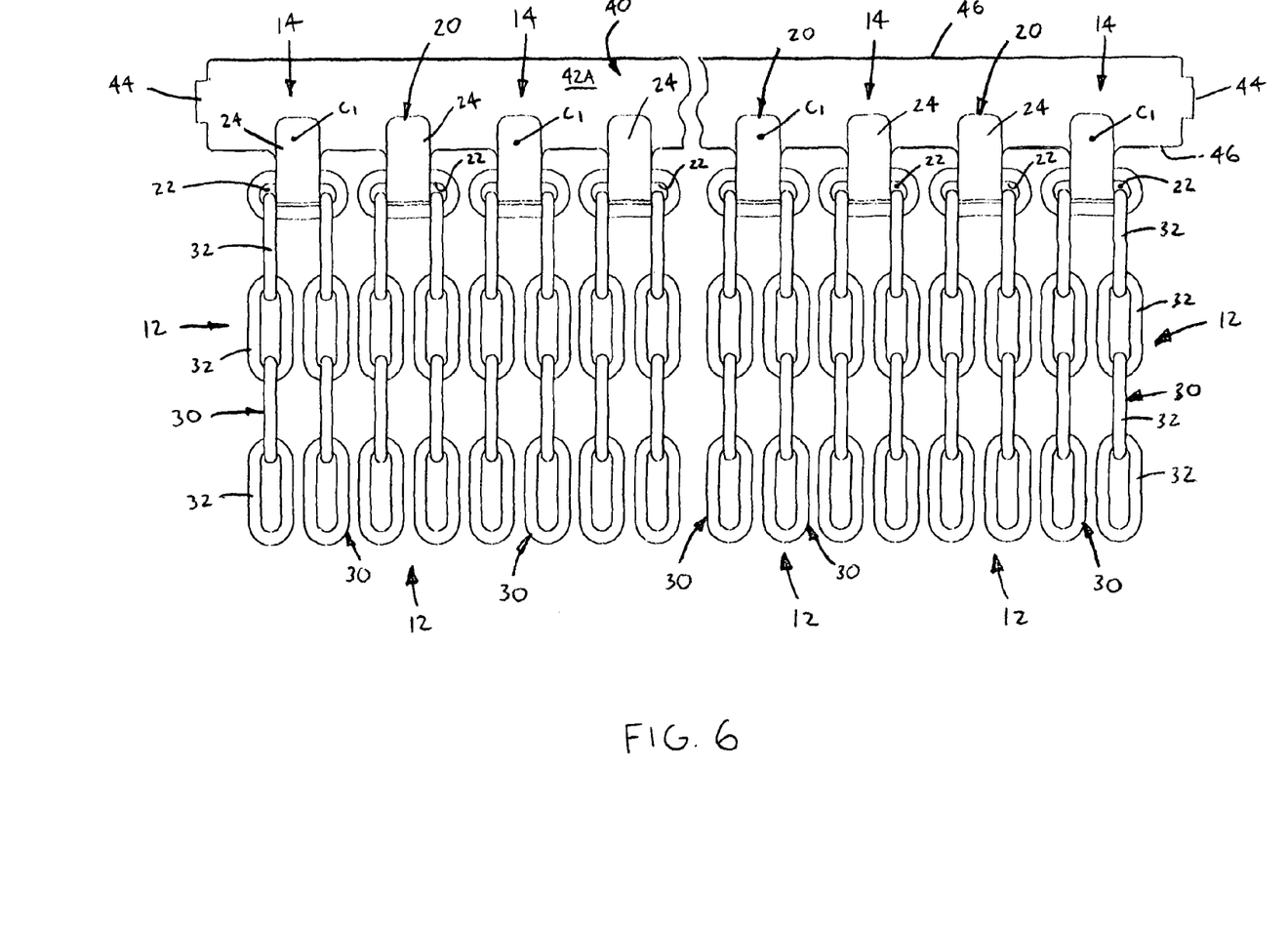
FIG. 6 is plan view of the anti-segregation device.
Figure 7:
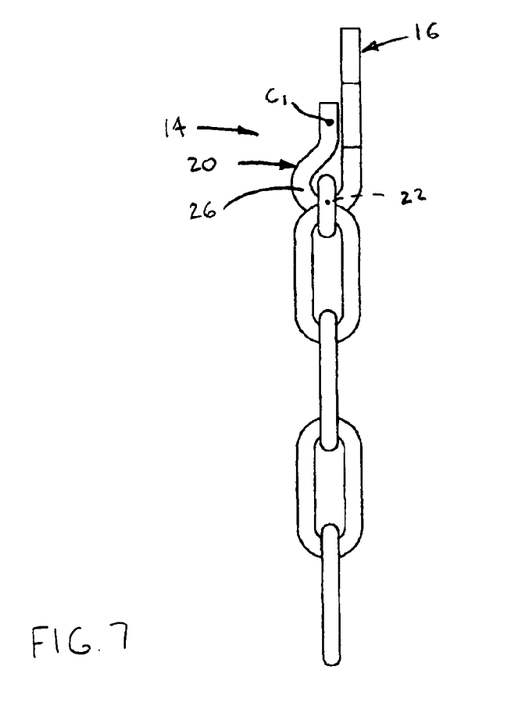
FIG. 7 is a side view of the anti-segregation device.
Figure 13:
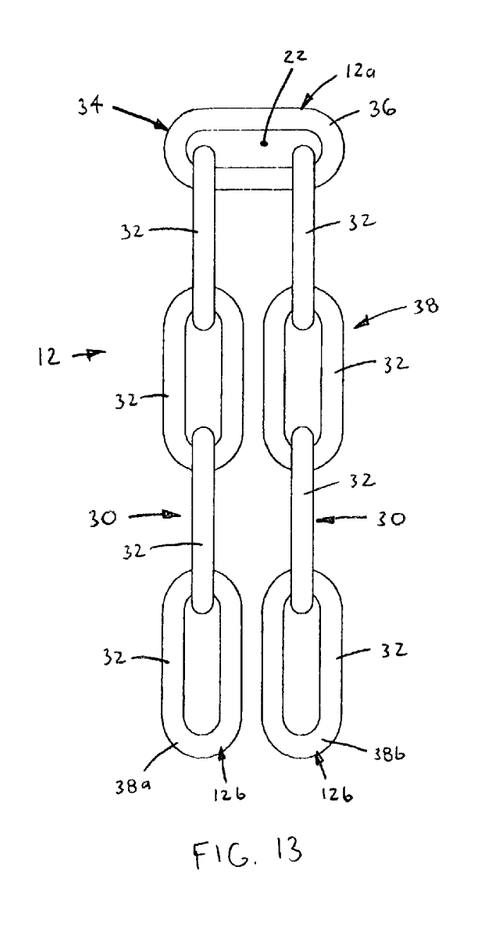
FIG. 13 is a plan view of a first, presently preferred construction of a barrier member.

Referring to FIGS. 6 and 13, each barrier member 12 preferably includes at least one and most preferably two chains or chain sections 30, each chain 30 having a plurality of connected links 32. More specifically, each barrier member 12 preferably includes an upper base section 34 providing the member first end 12a and the two chain sections 30 are each attached to the base section 34 and provide the member lower end 12b. Each one of the two chain sections 30 extends generally vertically and generally parallel to the other one of the chain sections 30. Further, each section 30 is separately movable or pivotable in generally longitudinal and generally lateral directions with respect to the base section 34, and thereby also with respect to the tractor 2. Furthermore, each base section 34 preferably provides the mounting opening 22 of each barrier member 12, such that each coupler 14 is engaged/engageable with the base section 34 of a separate one of the barrier members 12 to couple the members 18 to the tractor 2.

Figure 14:
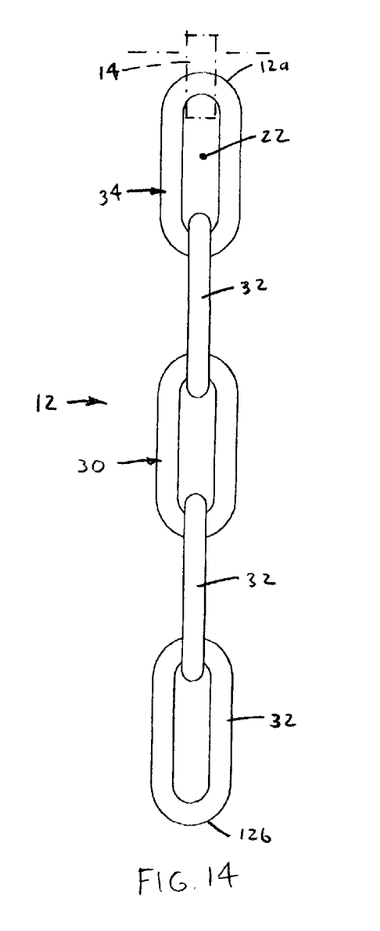
FIG. 14 is a plan view of a second, alternative construction of a barrier member, shown with a coupler in phantom.

Preferably, each base section 34 includes or is formed as a single chain link 36, with each chain section 30 being connected with the base section 34 by "interlinking" one link 32 of each chain section 30 with the base section link 36. Most preferably, each barrier member 12 is formed as a single chain 38 with opposing ends 38a, 38b, with a central link 36 providing the preferred base section 34 and two remainder sections extending between the central link 36 and each end 38a, 38b providing each barrier chain section 30, as best shown in FIG. 13. Although preferably formed as a single chain 38 providing two chain sections 30 and the base section 34, each barrier member 12 may be formed in any other appropriate manner. For example, each barrier member 12 may be formed with only a single chain section 30, as shown in FIG. 14. Further for example, the base section 34 may be formed as a block or bar with an opening providing the mounting opening 22, with two separate chain sections 30 being attached by any appropriate means, such as by welding, a fastener, engagement with a mounting opening, etc. As yet a further example, each chain section 30 may be formed as a string of pivotally connected plates (not shown) as opposed to links 32.

Referring now to FIGS. 3-6, 15 and 16, the base plate 16 preferably extends generally laterally along the rear end 2a of tractor 2 and the plurality of couplers 14 are spaced apart laterally on the base plate 16. More specifically, the base plate 16 preferably includes a generally flat, generally rectangular elongated body 40 with generally parallel front and rear surfaces 42A, 42B and opposing lateral ends 44. Further, two generally parallel, laterally-extending edges 46 extend between the side ends 44. With such a base plate structure, the tab body 24 of each coupler 14 is preferably formed as a generally flat bar 50 having a first end attached to, and most preferably integrally formed with, one of the plate edges 46 and a second end spaced outwardly from the plate edge 46, as indicated in FIG. 15. Each tab bar 50 extends outwardly from the plate edge 46 and generally parallel with the plate surfaces 42A, 42B in an initial position $P_I$, and is deflected from the initial position $P_I$ to the tab first configuration $C_1$ to connect the one of the barrier members 12 with the tractor 2 (see, e.g., FIGS. 6 and 7). Furthermore, the base plate body 40 and the plurality of tab bars 50 are preferably formed as a one-piece construction, most preferably by stamping but may alternatively be cast or machined from a plate.

With the preferred structures as described above, the plurality of barrier members 12 are each connected to the base plate 16 by first inserting a tab bar 50 of a separate one of the couplers 14 into the base member opening 22 of the particular member 12. Then, the coupler tab bars 50 are each deflected or bended to the tab first configuration $C_1$ to releasably retain the barrier members 12 to the base plate 16, as indicated in FIGS. 8A and 8B. Preferably, the barrier members 12 are all mounted to the base plate 16, and then the base plate 16 is mounted to the tractor rear end 2a by any appropriate means (e.g., fasteners, mounting brackets, welding, etc.), so as to thereby couple the barrier members 12 with the tractor 2. Alternatively, the base plate 16 may first be mounted to the tractor 2 and then the barrier members 12 may be connected with the mounted base plate 16.

Although the anti-segregation device 10 preferably includes a base plate 16 and couplers 14 integrally formed with the plate 16, the couplers 14 may alternatively be separately formed and attached to the base plate 16. As another alternative, the anti-segregation device 10 may be constructed without a base plate 16, such that the couplers 14 are individually mounted or connected with the tractor rear end 2a.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A material anti-segregation device for a paving vehicle, the vehicle including a tractor, a screed towed from the tractor for forming a mat of paving material on a base surface, and an auger disposed between the tractor and the screed, the anti-segregation device comprising:
a plurality of flexible, elongated barrier members each couplable with the tractor to collectively define a curtain, the curtain being configured to generally retain paving material between the curtain and the screed; and
a plurality of reusable couplers, each coupler, in a first configuration, connecting at least a portion of a separate one of the barrier members with the tractor and, in a second configuration, disconnecting the at least a portion of the one barrier member from the tractor when tension in the connected member exceeds a predetermined value so as to prevent damage to the tractor, each coupler being bendable from the first configuration toward the second configuration, each coupler thereafter being bendable from the second configuration toward the first configuration to connect at least a portion of a separate one of the barrier members with the tractor.

2. The anti-segregation device as recited in claim 1 wherein each one of the barrier members is connected with one of a portion of the tractor and a component of the tractor and the predetermined tension value is less than a failure limit of the one of the tractor portion and tractor component.

3. The anti-segregation device as recited in claim 1 wherein each barrier member has a first end connected with the tractor and a second, free end generally disposeable upon the base surface and each coupler is configured to disconnect from the at least a portion of the one barrier member when the barrier member second end is held generally stationary with respect to the base surface during movement of the tractor.

4. The anti-segregation device as recited in claim 1 wherein each barrier member has a first, upper end and a second, lower end, the second end being disposeable generally upon the base surface, and one of:
each coupler is mounted on the tractor and configured to releasably engage with the upper end of the connected barrier member; and
each barrier member includes upper and lower portions, the upper portion providing the retainer first end, the first end being attached to the tractor, the lower portion providing the retainer second end, and each coupler is configured to releasably connect the lower portion of a separate one of the barrier members with the upper portion of the barrier member.

5. The anti-segregation device as recited in claim 1 wherein each coupler is configured to bend between first and second configurations to disconnect the at least one barrier member from the tractor.

6. The anti-segregation device as recited in claim 1 wherein each barrier member includes a base section and two chain sections each attached to the base section, each one of the two chain sections extending generally vertically and generally parallel to the other one of the chain sections, and each coupler is engaged with the base section of a separate one of the barrier members.

7. The anti-segregation device as recited in claim 1 wherein each barrier member includes at least one chain with a plurality of connected links.

8. The anti-segregation device as recited in claim 1 wherein each coupler is configured to release the barrier member connected with the coupler separately from each other barrier member.

9. The anti-segregation device as recited in claim 1 further comprising a base plate connected with the tractor, each coupler being one of mounted to the base plate and integrally formed with the base plate.

10. The anti-segregation device as recited in claim 1 wherein each coupler includes a bendable tab configured to engage with a separate one of the barrier members and to deflect between a first configuration in which the coupler retains the barrier member connected with the tractor and a second configuration in which the barrier member is removable from the tab so as to disconnect from the tractor, the tab being configured to deflect from the first configuration toward the second configuration when tension in the barrier member exceeds the predetermined value.

11. The anti-segregation device as recited in claim 10 wherein each barrier member includes an opening and each tab has an elongated body with first and second ends, the tab body being configured to extend through the opening of the engaged barrier member, to generally form a hook in the tab first configuration such that the body first end is located at least generally proximal to the body second end, and to generally bend toward a flattened form as the body first end displaces away from the second end when deflecting from the first configuration to the second configuration, the barrier member being displaceable over the tab first end in a direction generally away from the tab second end when the tab body is disposed in the tab second configuration so as to withdraw the tab body from the barrier member opening and thereby disconnect the barrier member from the tractor.

12. The anti-segregation device as recited in claim 11 wherein the barrier member is displaceable over the tab first end in a direction generally toward the tab second end when the tab body is disposed in the tab second configuration so as to insert the tab body into the barrier member opening, the tab body being deflectable from the second configuration toward the first configuration when the tab body is disposed within the barrier member opening so as to connect the barrier member with the tractor.

13. The anti-segregation device as recited in claim 10 wherein each coupler tab is deflectable toward the first configuration to connect a barrier member to the tractor.

14. The anti-segregation device as recited in claim 10 further comprising a generally elongated base plate mounted to the tractor, each coupler tab being integrally formed with the base plate.

15. The anti-segregation device as recited in claim 14 wherein the base plate extends generally laterally along a rear end of the tractor and the plurality of couplers are spaced apart laterally on the base plate.

16. A material anti-segregation device for a paving vehicle, the vehicle including a tractor, a screed towed from the tractor for forming a mat of paving material on a base surface, and an auger disposed between the tractor and the screed, the anti-segregation device comprising:
a plurality of flexible, elongated barrier members each couplable with the tractor to collectively define a curtain, the curtain being configured to generally retain paving material between the curtain and the screed; and
a plurality of couplers, each coupler being configured to connect at least a portion of a separate one of the barrier members with the tractor and to disconnect the at least a portion of the one barrier member from the tractor when tension in the connected member exceeds a predetermined value so as to prevent damage to the tractor, wherein each coupler includes a tab;

wherein each barrier member includes an opening and each tab has an elongated body with first and second ends, the tab body being configured to extend through the opening of the engaged barrier member, to generally form a hook in a tab first configuration such that the body first end is located at least generally proximal to the body second end, and to be generally bendable toward a flattened form as the body first end displaces away from the second end when deflecting from the first configuration to a second configuration, the barrier member being displaceable over the tab first end in a direction generally away from the tab second end when the tab body is disposed in the tab second configuration so as to withdraw the tab body from the barrier member opening and thereby disconnect the barrier member from the tractor;

further comprising a generally elongated base plate mounted to the tractor, each coupler tab being integrally formed with the base plate;

wherein the base plate is generally flat with generally parallel front and rear surfaces and a laterally extending edge and each tab body is formed as a generally flat bar having a first end attached to the plate edge and a second end spaced outwardly from the plate edge, the bar extending outwardly from the plate edge and generally parallel with the plate surfaces in an initial position, each tab bar being deflectable from the initial position to the first configuration to connect the engaged one of the barrier members with the tractor.

17. A material anti-segregation device for a paving vehicle, the vehicle including a tractor, a screed towed from the tractor for forming a mat of paving material on a base surface, and an auger disposed between the tractor and the screed, the anti-segregation device comprising:

a plurality of flexible, elongated barrier members each couplable with the tractor to collectively define a curtain, the curtain being configured to generally retain paving material between the curtain and the screed; and a plurality of reusable couplers, each coupler including a bendable tab engageable with a separate one of the barrier members and deflectable between a first configuration, in which the coupler retains the barrier member connected with the tractor, and a second configuration, in which the barrier member is removable from the tab so as to disconnect from the tractor, the tab being deflectable from the first configuration toward the second configuration when tension in the barrier member exceeds a predetermined value, the tab thereafter being deflectable toward the first configuration to retain the barrier member connected to the tractor.

18. The anti-segregation device as recited in claim 17 wherein:

each barrier member includes an opening and each tab has an elongated body with first and second ends, the tab body being configured to extend through the opening of the engaged barrier member, to generally form a hook in the tab first configuration such that the body first end is located at least generally proximal to the body second end, and to generally bend toward a flattened form as the body first end displaces away from the second end when deflecting from the first configuration to the second configuration; and the barrier member is displaceable over the tab first end in a direction generally away from the tab second end when the tab body is disposed in the tab second configuration so as to withdraw the tab body from the barrier member opening and thereby disconnect the barrier member from the tractor and is alternatively displaceable over the tab first end in a direction generally toward the tab second end when the tab body is disposed in the tab second configuration so as to insert the tab body into the barrier member opening, the tab body being deflectable from the second configuration toward the first configuration when the tab body is disposed within the barrier member opening so as to connect the barrier member with the tractor.

19. The anti-segregation device as recited in claim 17 wherein each barrier member includes a base section and two chain sections each attached to the base section, each one of the two chain sections extending generally vertically and generally parallel to the other one of the chain sections, and each coupler is engaged with the base section of a separate one of the barrier members.

20. A material anti-segregation device for a paving vehicle, the vehicle including a tractor, a screed towed from the tractor for forming a mat of paving material on a base surface, and an auger disposed between the tractor and the screed, the anti-segregation device comprising:

a plurality of flexible, elongated barrier members each couplable with the tractor to collectively define a curtain, the curtain being configured to generally retain paving material between the curtain and the screed, each barrier member having a first end connected with the tractor and as second, free end disposeable generally upon the base surface; and a plurality of reusable couplers, each coupler, in a first configuration, connecting at least a portion of a separate one of the barrier members with the tractor and, in a second configuration, allowing the at least a portion of the one barrier member to disconnect from the tractor when the barrier member second end is held generally stationary with respect to the base surface during movement of the tractor, each coupler being bendable from the first configuration toward the second configuration to enable the separate one of the barrier members to disconnect from the tractor, each coupler thereafter being bendable from the second configuration toward the first configuration to connect at least a portion of a separate one of the barrier members with the tractor.

21. A material anti-segregation device for a paving vehicle, the vehicle including a tractor, a screed towed from the tractor for forming a mat of paving material on a base surface, and an auger disposed between the tractor and the screed, the anti-segregation device comprising:

a plurality of flexible, elongated barrier members each coupled with the tractor and collectively defining a curtain, the curtain being configured to generally retain paving material between the curtain and the screed;

a plurality of reusable couplers, each coupler including a bendable tab engaging with a separate one of the barrier members and deflectable between a first configuration, in which the coupler retains the barrier member connected with the tractor, and a second configuration, in which the barrier member is removable from the tab so as to disconnect from the tractor, the tab deflecting from the first configuration toward the second configuration when tension in the barrier member exceeds the predetermined value; and a generally elongated base plate mounted to the tractor, each tab being integrally formed with the plate, each tab having a first end attached to the plate and a second end spaced outwardly from the plate, in an initial configuration, each tab extending outwardly from the plate and generally parallel with a surface of the plate, each tab being deflectable from the initial configuration to the first configuration to connect the engaged one of the barrier members with the tractor.

22. The anti-segregation device as recited in claim 21 wherein each tab is constructed to be bent from the second configuration toward the first configuration to connect at least a portion of a separate one of the barrier members with the tractor after being bent from the first configuration toward the second configuration to enable the separate one of the barrier members to disconnect from the tractor.

* * * * *